A. T. BALL.
SHAFT BEARING.
APPLICATION FILED DEC. 4, 1919.
1,350,953.
Patented Aug. 24, 1920.
2 SHEETS—SHEET 2.
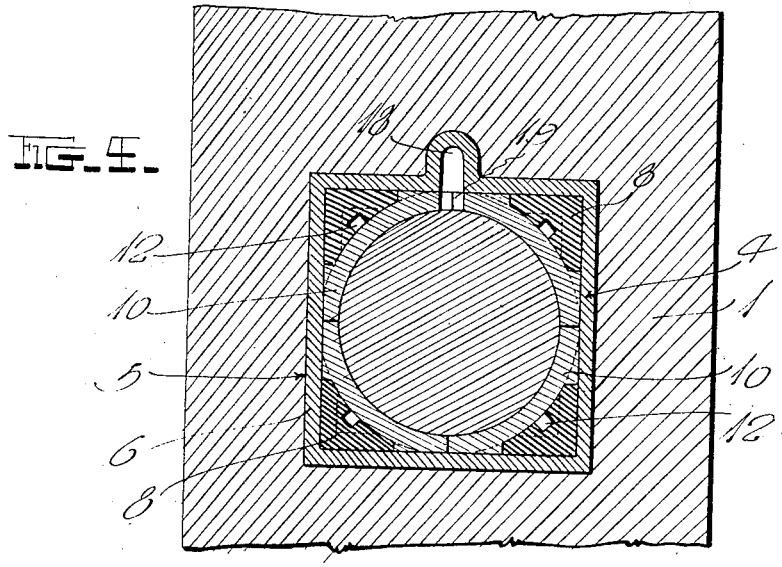
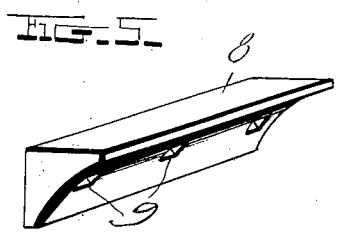
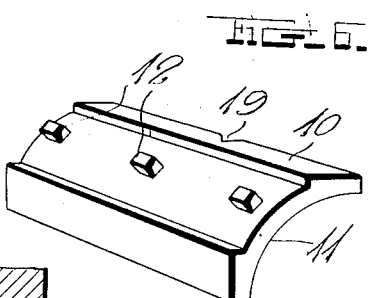
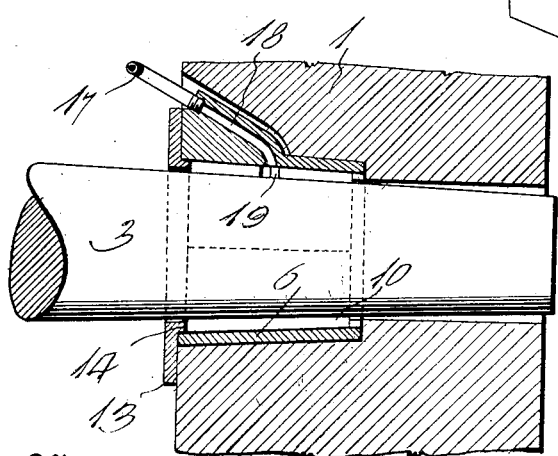
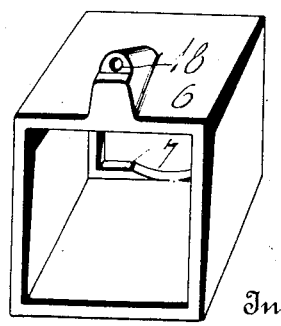
Witness
H. Woodard
Inventor
A. T. Ball
By H. B. Wilson & Co.
Attorneys

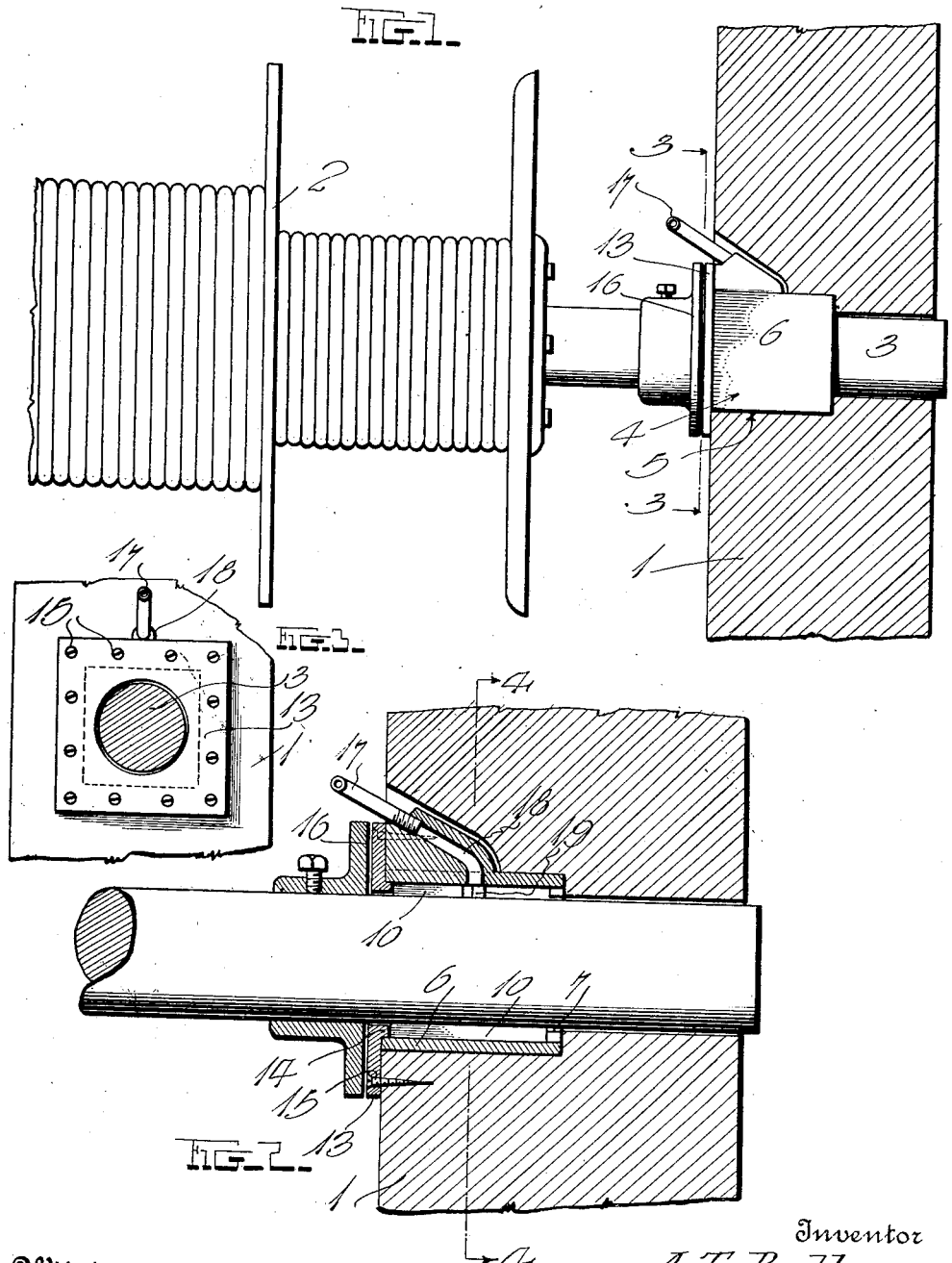

UNITED STATES PATENT OFFICE.

ARTHUR THOMAS BALL, OF RANGER, TEXAS.

SHAFT-BEARING.

1,350,953.  Specification of Letters Patent.  Patented Aug. 24, 1920.

Application filed December 4, 1919. Serial No. 342,343.

*To all whom it may concern:*

Be it known that I, ARTHUR T. BALL, a citizen of the United States, residing at Ranger, in the county of Eastland and State of Texas, have invented certain new and useful Improvements in Shaft-Bearings; and I do declare the following to be a full, clear, and exact description of the invention, such as will enable others skilled in the art to which it appertains to make and use the same.

This invention relates to improvements in shaft bearings, and it has more particular reference to a bearing which is especially designed to be used in connection with drilling tools and apparatus employed in connection with well fishing tools, although it may be used for various other purposes.

The main object of the invention is to provide a bearing for shafts which is especially designed to stand heavy thrusts, one which is of such construction that the parts may be easily and readily removed and replaced, the whole device consisting of very few parts, thus reducing the cost of manufacture.

Other objects and advantages of the invention will become apparent during the course of the following description.

In the accompanying drawings forming a part of this specification and in which like numerals are employed to designate like parts throughout the same, Figure 1 is a side elevation of a device constructed in accordance with my invention.

Fig. 2 is a central vertical section thereof.

Fig. 3 is a section on the plane of the line 3—3 of Fig. 1, looking in the direction of the arrows.

Fig. 4 is a transverse section on the plane of the line 4—4 of Fig. 3.

Figs. 5, 6, and 7 are detail perspective views of one of the bearing blocks, one of the bearing members, and the casing into which these parts are fitted, respectively.

Fig. 8 is a view like Fig. 3, illustrating a slight modification.

Inasmuch as my bearing is especially designed to be used in connection with apparatus employed in oil well districts for removing tools from the wells, I have shown parts of such apparatus which I have here designed as a post or support 1 and sand reels 2 which are carried by this support. It is generally well known that in the parts of the country where a great deal of the above mentioned type of work is carried on, that it is a hard matter to obtain metal apparatus for carrying on the work. It is therefore necessary to employ timber for these apparatuses. Practically all of the different parts of the apparatus are composed of wood except the shafts and other miscellaneous details, and in order to provide bearings for these shafts, it is the general practice to form holes or openings in the wooden supports or post, for the shafts to bear in. As the apparatus for carrying on such work is generally subjected to heavy work and strain, the holes in the supports which form bearings for the shafts become easily and readily worn and in a short time their usefulness is greatly impaired. Various types of bearings have been employed for this purpose, but those that are known to me have not proved satisfactory, and I have therefore especially designed my bearing to overcome circumstances which have heretofore occurred. That is, I have designed and so connected my bearing with the support 1 that it will not easily be pulled off of this connection, and I also employ novel means for retaining the bearing in position on the support. The sand reels which I have designed at 2 carry cables which have a fishing tool connected to their free ends which goes into the well and fishes the tools out in the well known manner. As before stated, the numeral 1 indicates a timber support which will be referred to in the following description as a post and its purpose is to support one end of the shaft 3 upon which the reels 2 are mounted. The above parts are of the usual and well known construction and form no part of this invention. In order to properly support my bearing which is here designated, as a whole, by the numeral 4, I form a recess or opening 5 in the post 1 into which my bearing is inserted.

The bearing 4 includes a substantially rectangular casing 6, which is formed from a single casting and is open at its opposite ends as shown more clearly in Fig. 7. Casing 6 includes an inwardly extending flange 7 disposed at one end thereof and entirely surrounding the opening at that end. A plurality of substantially triangular bearing blocks 8 are adapted to be inserted into the casing 6 and abut the flange 7. Any number of such blocks could be employed, however, I have shown four of them, one for each corner of the rectangular casing 6. Each one of these bearing blocks is provided with a plurality of spaced non-circular holes 9, the purpose of which will hereinafter be set forth. These bearing blocks will be preferably made from steel or other suitable cheap metal so as to reduce the cost of manufacture of the device. I also employ a plurality of bearing members 10 which are preferably made of brass or Babbitt metal. There are also four of these members 10 and each one is substantially arcuate in general outline and has an inner concave face as indicated at 11, so as to form a smooth bearing surface for the cylindrical shaft 3. The outer face of the member 10 is provided with spaced flat-faced projections or lugs 12 which fit into the apertures 9 in the block 8, thus serving to secure these parts together. While I have shown lugs to be fitted into openings to secure the members 8 and 10 together, I desire it to be understood that it may be accomplished in any other way. After the members 8 and 10 have been secured together in the manner set forth they are placed in the casing 6 in the manner shown in Fig. 4, and they provide a complete bearing surface for the shaft 3. In order to retain these bearings 8 and 10 in the casing and also in order to provide means for retaining the casing itself in the recess 5 of the post, I provide a substantially rectangular plate 13 which is provided with a circular opening at its center to permit passage of the shaft 3 therethrough. Surrounding the opening at the center of the plate 13 is an inturned continuous flange 14 which is designed to bear against the ends of the parts 8 and 10 and retain them against endwise movement in one direction, these parts being retained against movement in the other direction by means of the continuous flange 7. As the distance from the outer edges of the flange 14 is less than the distance from the inner surfaces of the casing 6, it will be seen that this flange 14 will extend slightly into the casing so as to permit it to engage the members 8 and 10 and retain them in position as above set forth. Plate 13 is secured upon a post 1 by means of screws 15 which pass through openings therein and extend into the post 1. This construction serves to retain the casing in the recess 3. The openings through which the screws pass will preferably be countersunk so that the heads of the screws will not project beyond the outer surface thereof. This is done in order to prevent the heads of the screws from becoming worn off by means of a collar 16 on the shaft 3 which at times frictionally engages the outer surface of the plate 13.

As the parts of my bearing will necessarily need to be lubricated, I provide an oil supply pipe 17 which communicates with the oil passage 18 in the casing 6, the oil being permitted to reach the shaft through the opening 19 in the members 10. While I have shown and described a particular means for supplying oil to the shaft 3, I desire it to be understood that any other suitable means may be employed for this purpose.

With a bearing of the foregoing construction it will be seen that it may be effectively employed for the purposes set forth, as there is very little possibility of it being pulled out of place. In similar devices known to me the bearings are generally of such construction that they have to be attached by means of bolts and screws to the post, and constant use thereof soon causes them to break away from the support and become useless. I overcome this by forming a recess 3 and place the bearing and all of its parts in this recess thereby placing practically all of the strain to which it is subjected upon the post 1 and increasing the strength of the bearing. All of the parts of my bearing are of such construction that they may be readily removed for repairs or replaced by new parts. A bearing of my construction will be found advantageous for the purpose for which it is designed and will also be found very inexpensive.

While I have shown and described my invention as being especially adapted to be used in connection with apparatus employed in fishing tools from oil wells or other wells, I desire it to be understood that it may also be effectively used to support shafts of various other types of machinery and apparatus.

In Fig. 8 I have shown a slight modification of my bearing. By referring to this figure it will be seen that the construction of the device is identical with that already described, except that this bearing is especially designed to be used in connection with tapered shafts which are also employed in work of the nature already described.

From the foregoing description and drawings it is believed that the manner of assembling the parts and the manner in which it operates and the advantages of the device, have been fully set forth, therefore, further description is deemed unnecessary.

I claim:

1. The combination with a support having an opening formed therein, the inner end of the same being cylindrical and the outer end being enlarged and rectangular in shape; of a substantially rectangular casing fitted in the last named part of the opening, said casing being open at its opposite ends, one of the open ends being surrounded by a continuous laterally extending flange, a plurality of bearing members fitted in said casing and abutting said lateral flange, and an apertured closing plate for the other end of the casing, said plate having a central circular opening for the passage of the shaft which extends through the other end of the casing and cylindrical portion of the aforesaid opening, the opening in said plate being surrounded by a continuous laterally disposed flange extending into the casing and abutting the adjacent edges of the bearing members, thus retaining the latter in position, fastening members passing through the apertures in the plate and into the support, and additional means on the shaft bearing against the outer face of said plate for retaining the latter against possible displacement.

2. A bearing for shafts comprising a rectangular casing provided at one end with stop means, being open at its opposite end, a plurality of substantially triangular bearing blocks fitted into the four corners of the casing and bearing against said stop means, said blocks being provided with a plurality of spaced non-circular apertures, a plurality of arcuate bearing members having flat-face projections thereon adapted to fit into the apertures in the bearing blocks, the inner faces of said members being curved to form a smooth bearing for a shaft, and a closing plate for the casing adapted to engage the opposite ends of the bearing members and blocks to retain them against end-wise movement.

In testimony whereof I have hereunto set my hand.

ARTHUR THOMAS BALL.